United States Patent
Lee et al.

(10) Patent No.: US 7,391,737 B2
(45) Date of Patent: Jun. 24, 2008

(54) METHOD AND APPARATUS FOR MEASURING QUALITY OF SERVICE IN VOICE-OVER-IP NETWORK APPLICATIONS BASED ON SPEECH CHARACTERISTICS

(75) Inventors: Minkyu Lee, Ringoes, NJ (US); James William McGowan, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 673 days.

(21) Appl. No.: 10/953,907

(22) Filed: Sep. 29, 2004

(65) Prior Publication Data

US 2006/0067329 A1 Mar. 30, 2006

(51) Int. Cl.
*G01R 31/08* (2006.01)
(52) U.S. Cl. .......................... 370/252; 370/352
(58) Field of Classification Search ........................ None
See application file for complete search history.

(56) References Cited

U.S. PATENT DOCUMENTS

| | | | |
|---|---|---|---|
| 6,584,104 B1 | 6/2003 | McGowan | 370/394 |
| 6,731,634 B1 | 5/2004 | McGowan | 370/394 |
| 6,952,668 B1 * | 10/2005 | Kapilow | 704/206 |
| 2002/0154641 A1 | 10/2002 | McGowan | 370/401 |
| 2003/0227870 A1 * | 12/2003 | Wagner et al. | 370/229 |

OTHER PUBLICATIONS

U.S. Appl. No. 10/936,990, filed Sep. 9, 2004, Lee et al.
ITU-T (International Telecommunication Union Standardization Sector) G. 711, Appendix I: "A high quality low-complexity alogrithm for packet loss concealment with G.711," Sep. 1999.

* cited by examiner

*Primary Examiner*—Chau Nguyen
*Assistant Examiner*—Kenneth R Hartmann
(74) *Attorney, Agent, or Firm*—Kenneth M. Brown

(57) ABSTRACT

A method and apparatus for measuring Quality-of-Service (QoS) in packet-based communications networks for Voice-over-IP applications is advantageously based not only on packet loss information but also on particular characteristics of the speech data itself. Measurement of failures of the "quasi-stationary" (QS) property of speech—that is, the assumption that both the pitch and spectral envelop usually vary slowly relative to the packet size—are advantageously used in conjunction with measures of packet loss characteristics (e.g., packet loss rates or burst ratios) to calculate a QoS measure. One specific QS failure measure—referred to herein as QSFE (quasi-stationary failure estimate)—advantageously estimates the phoneme rate and is used in one illustrative method for calculating a QoS measure for Voice-over-IP applications in the presence of packet loss.

18 Claims, 2 Drawing Sheets

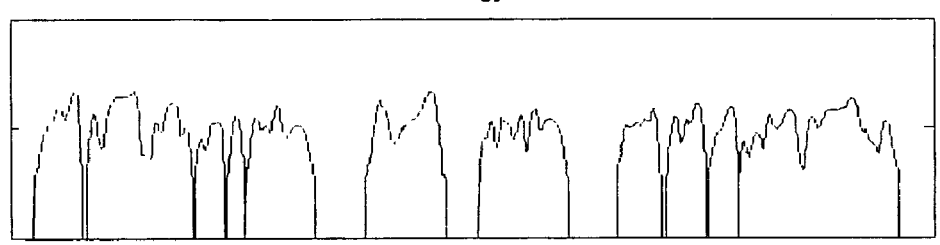
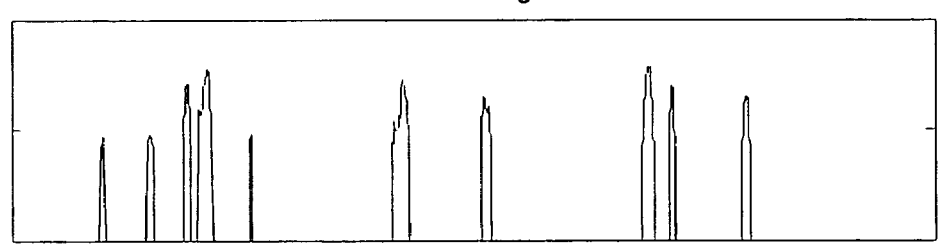
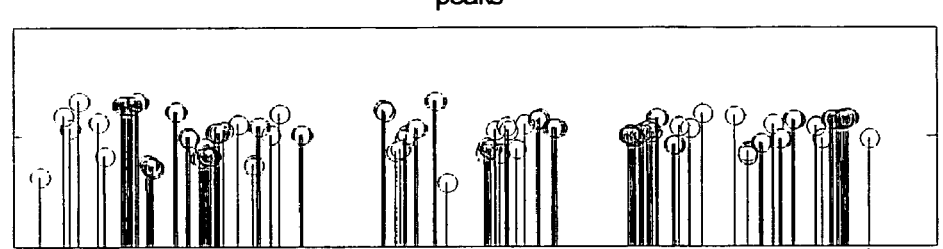
FIG. 1A
FIG. 1B
FIG. 1C
FIG. 1D
FIG. 1

METHOD AND APPARATUS FOR MEASURING QUALITY OF SERVICE IN VOICE-OVER-IP NETWORK APPLICATIONS BASED ON SPEECH CHARACTERISTICS

FIELD OF THE INVENTION

The present invention relates generally to Voice-over-IP (VoIP) applications in packet-based communications networks and more particularly to a method and apparatus for measuring Quality-of-Service (QoS) in such networks based on speech characteristics and under conditions of packet loss.

BACKGROUND OF THE INVENTION

The ITU-T SG12 (International Telecommunication Union Standardization Sector's Study Group 12) is currently standardizing systems for measuring Quality-of-Service (QoS) for Voice-over-IP (VoIP) from an end-user perspective. Central to all such systems is the effect of packet loss on the voice signal. Packet loss typically results in small (usually 10-40 millisecond) speech segments being removed from playback of voice, and can result in audible distortions. Therefore, most QoS measures are based on packet loss information relating to the quantity and/or distribution of lost packets, such as, for example, the packet loss rate (representing a percentage of lost packets to total packets) or a "burst ratio" of lost packets (representing the length of successive strings of lost packets). (See, e.g., U.S. patent Application Publication No. US 2002/0154641 A1, "Burst Ratio: A Measure Of Bursty Loss On Packet-Based Networks, published on Oct. 24, 2002, filed on Feb. 1, 2001 by James W. McGowan as U.S. patent application Ser. No. 09/773,799 and commonly assigned to the assignee of the present invention. U.S. patent application Publication No. US 2002/0154641 A1 is hereby incorporated by reference as if fully set forth herein.) Other QoS measures based on lost packet information include the "packet loss distortion rate" and the "media distortion rate," each of which is based on lost packet data as well as data comprised in packets which are not lost but whose proper interpretation is based on data from packets which are lost. (See, e.g., co-pending U.S. patent application Ser. No. 10/936,990, "Method And Apparatus For Performing Quality-Of-Service Calculations On Packet-Based Networks," filed on Sep. 9, 2004 by M. Lee and J. McGowan and commonly assigned to the assignee of the present invention. U.S. patent application Ser. No. 10/936,990 is also hereby incorporated by reference as if fully set forth herein.)

In the presence of packet loss, packet loss concealment (PLC) schemes are typically used in an attempt to mitigate the effect of distortions on the listener by replacing missing speech data from lost packets with substitute speech data. For example, packet repetition is one simple PLC scheme that repeats the last correctly received packet (or a scaled version of that packet) when a packet loss occurs.

Some of the motivation behind using a scheme such as packet repetition for packet loss concealment is the observation that speech tends to follow "quasi-stationary" (QS) behavior—that is, both the pitch and spectral envelop usually vary slowly relative to the packet size. The best estimate of the speech in a lost packet, therefore, is often the speech in the previous and/or the following packets. (To minimize delay, typically only the previous packet is used, although backward prediction from subsequent packets has also been used and does tend to improve prediction.)

The use of PLC techniques such as packet repetition, however, can result in sharp discontinuities at the boundaries between packets, although there are known methods for minimizing the effects of these discontinuities. More sophisticated algorithms, such as the well known speech coding standard G.711 PLC, attempt to increase voice quality by varying the temporal extent of the repeated portion as well as making some adjustments for distortions introduced at the boundaries. Nonetheless, they also rely on the assumption that the lost speech and previous speech have essentially identical pitch and spectral envelop.

However, it is known for example that the QS assumption fails (i.e., a "QS failure" occurs) whenever a talker begins or ends a phoneme, the smallest unit of sound in a language. Certain sounds (such as diphthongs) show dynamic spectral characteristics within a phoneme. This occurs up to several times per second in normal speech, depending upon the language, talker and the individual words being spoken.

In addition, the perceptual effect of packet loss on the end user depends, in part, on how often this QS property is violated, since violations of the QS property indicate occasions that the PLC scheme is based on a faulty assumption, and is therefore likely to fail to adequately conceal the packet loss. Although there are a number of known speech quality (i.e., QoS) measures, currently none of these measures accounts for this critical effect.

SUMMARY OF THE INVENTION

In accordance with the principles of the present invention, a method and apparatus for measuring Quality-of-Service (QoS) in packet-based communications networks for Voice-over-IP applications is advantageously based not only on packet loss information but also on particular characteristics of the speech data itself. In particular, and in accordance with certain illustrative embodiments of the invention, an estimate of QS failures is advantageously used in conjunction with a measure of packet loss characteristics (e.g., packet loss rate or burst ratio) to calculate a QoS measure for Voice-over-IP network applications. And in accordance with one illustrative embodiment of the present invention, a specific QS failure measure—referred to herein as QSFE (quasi-stationary failure estimate)—advantageously estimates the phoneme rate and is used in a method for calculating a QoS measure for Voice-over-IP applications in the presence of packet loss.

BRIEF DESCRIPTION OF THE DRAWINGS

FIG. 1 shows a graphical display of a sample operation of a QSFE algorithm for measuring voice risk in accordance with one illustrative embodiment of the present invention; FIG. 1A shows a waveform of a 10 second speech sample; FIG. 1B shows the smoothed energy distribution over time of the sample waveform of FIG. 1A; FIG. 1C shows the smoothed zero-crossing rate of the sample waveform of FIG. 1A; and FIG. 1D shows the energy peaks that correspond to likely phoneme changes in the sample waveform of FIG. 1A.

DETAILED DESCRIPTION OF THE ILLUSTRATIVE EMBODIMENTS

Figure 2:
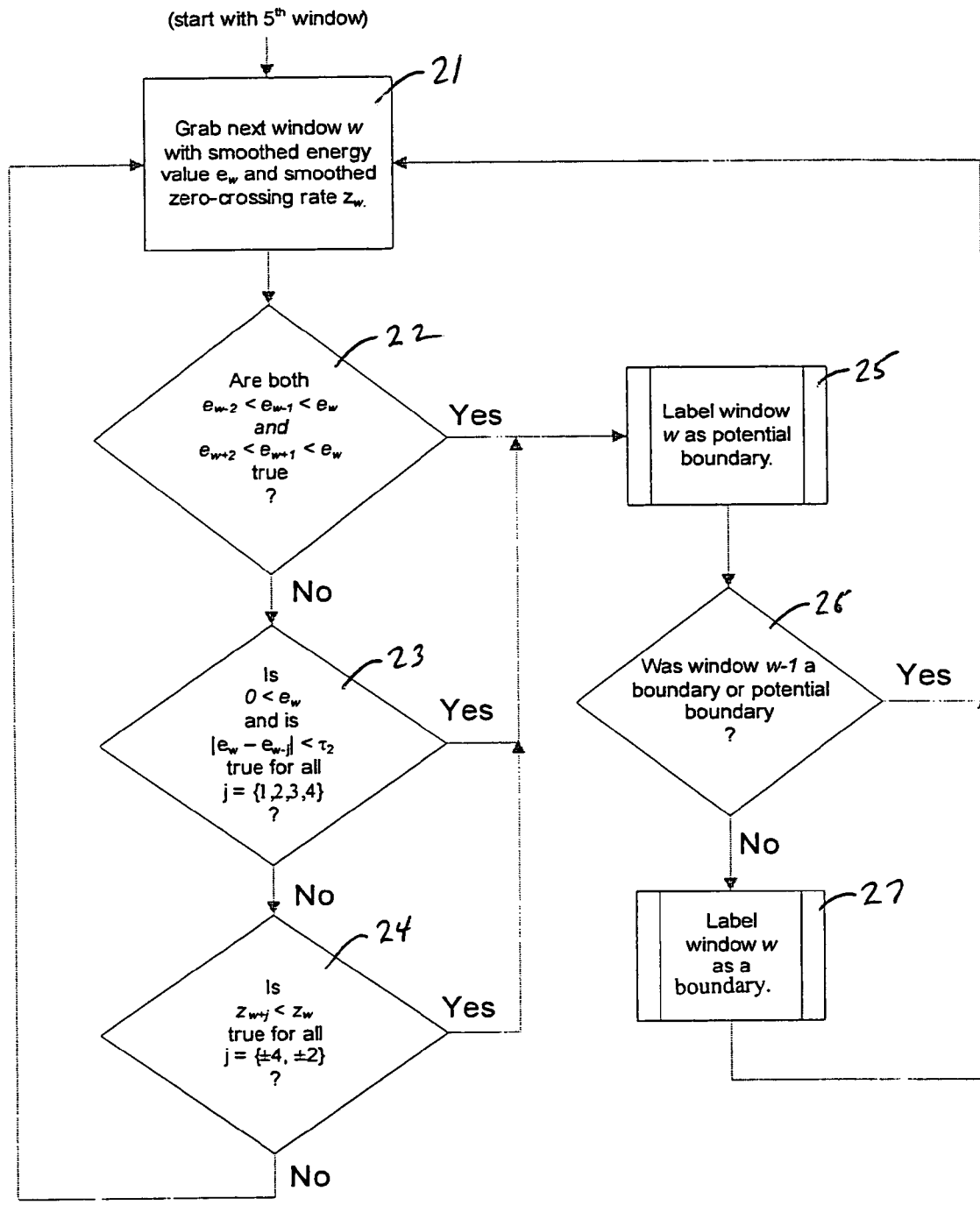
FIG. 2 shows an illustrative flowchart of a QSFE algorithm for measuring voice risk in accordance with one illustrative embodiment of the present invention.

As pointed out above, the success of PLC algorithms depends upon the algorithm's reliance upon the QS assumption, as well as the reliability of the QS assumption for a given speech sample. If an unpredictable change occurs in the pitch or vocal tract shape, the replacement material is not likely to match the missing material, and the user is more likely to hear a distortion in the voice. We introduce the term "voice concealability" to indicate the likelihood that speech will meet the QS assumption of the PLC algorithms, and the term "voice risk" to indicate the likelihood that speech will not meet this QS assumption. (In other words, "voice risk"=1/"voice concealability".) In addition, in accordance with one illustrative embodiment of the present invention, a specific measure of voice risk is described herein—we will refer to this specific measure as the "quasi-stationary failure estimate," or the QSFE, for short. The QSFE is essentially an estimate of the phoneme rate.

An "ideal" voice risk measure would calculate the proportion of times a PLC algorithm fails to adequately conceal lost speech from a listener. But such an "ideal" scheme would be too complex for most applications and would depend substantially on the details of the particular PLC algorithm being used. Thus, in accordance with one illustrative embodiment of the present invention, the QSFE provides a practical voice risk measure that, in particular, estimates the phoneme rate, specifically by counting the number of "bumps" in the energy of a speech waveform. First, in accordance with this illustrative embodiment of the present invention, energy and zero-crossing are found. These are then advantageously used to detect boundaries between phonemes, which can thus be counted.

FIG. 1 shows a graphical display of a sample operation of a QSFE algorithm for measuring voice risk in accordance with one illustrative embodiment of the present invention. FIG. 1A shows a waveform of a 10 second speech sample. The voice sample P shown in the figure may have been digitized by pulse code modulation, for example, as a set of N discrete points $P=\{p_1, p_2, \ldots, p_N\}$. (As is well known to those of ordinary skill in the art, pulse code modulation is a simple standard coding technique for speech signals, such as the technique promulgated by the International Telecommunication Union's ITU-T G.711 speech coding standard, fully familiar to those skilled in the art.) For this example, illustratively, $-16384 < p_i < 16383$, for $i=1, 2, \ldots, N$. Next, P is advantageously partitioned into a set of windows w, with each window having a fixed width n. Then, the energy over a given window w is given by:

$$e_w = \sum_{i=w_i}^{w_n} p_i^2. \quad (1)$$

Then, the zero-crossing rate $z_w$ is the frequency with which zero-crossings occur in within window w. In particular, a zero-crossing may be said to occur for sample $p_i$ if $abs(p_i) > \tau_1$, $abs(p_{i+1}) > \tau_1$, and $sgn(p_i) \neq sgn(p_{i+1})$, where "sgn" is the sign function (i.e., positive or negative), and "abs" is the absolute value function. Illustratively, and in the present example, $\tau_1 = 5$.

Next, both $e_w$ and $z_w$ are advantageously "smoothed" to reduce noise by replacing each measurement with an un-weighted average of that measurement with the four previous measurements. After this smoothing, values below a certain threshold are advantageously set to zero. Illustratively, and in the present example, we threshold energy values below 40% of the maximum energy value, and zero-crossing rates below 50% of the maximum zero-crossing rate. FIG. 1B shows the smoothed energy distribution $e_w$ over time of the sample waveform of FIG. 1A, and FIG. 1C shows the smoothed zero-crossing rate $z_w$ of the sample waveform of FIG. 1A.

Potential phoneme boundaries occur at peaks in the energy distribution and zero-crossing rate, as well as at energy plateaus (i.e., where the derivative is zero). In particular, an energy value $e_w$ is considered a peak if $e_{w-2} < e_{w-1} < e_w > e_{w+1} > e_{w+2}$, or a plateau if $e_w > 0$, and each of $|e_w - e_{w-j}| < \tau_2$, for, illustratively, and in this example, $j = \{1, 2, 3, 4\}$, and $\tau_2 = 0.02$. A zero-crossing rate value $z_w$ is considered a peak if each $z_{w+j} < z_w$, for, illustratively and in this example, $j = \{-4, -2, 2, 4\}$. FIG. 1D shows the energy peaks that correspond to likely phoneme changes in the sample waveform of FIG. 1A.

More specifically, in accordance with this illustrative embodiment of the present invention, each gap of at least one window or longer between consecutive boundaries is considered a phoneme. In other words, consecutive phoneme boundaries with no gap between are advantageously treated as a single boundary. The phoneme rate is then calculated as the number of phonemes per unit time. Finally, the voice risk as measured by the QSFE algorithm of the illustrative embodiment of the invention is set equal to this calculated phoneme rate, for a given period of time as may be specified.

FIG. 2 shows an illustrative flowchart of a QSFE algorithm for measuring voice risk in accordance with one illustrative embodiment of the present invention. In particular, the flowchart shown in the figure advantageously identifies windows which are to be considered phoneme boundaries. Based on this information, a phoneme rate may be calculated and advantageously used as a QFSE measure of voice risk.

Specifically, in block 21, the next window w is retrieved with smoothed energy value $e_w$ and smoothed zero-crossing value $z_w$. In particular, this window will be advantageously tested by the illustrative flowchart to determine if it should be labeled as a phoneme boundary. (Note that the flowchart as shown assumes that we are starting with the fifth window, since the four previous windows are required for various operations as described above and in the flowchart.)

First, decision box 22 checks to see if both $e_{w-2} < e_{-1} < e_w$ and $e_{w+2} < e_{w+1} < e_w$ are true. If so, block 25 labels the window w as a potential phoneme boundary. If not, decision box 23 checks to see if $e_w > 0$ and if each of $|e_w - e_{w-j}| < \tau_2$, for $j = \{1, 2, 3, 4\}$. Illustratively, $\tau_2 = 0.02$. If both of these are true, then again, block 25 labels the window w as a potential phoneme boundary. If not, decision box 24 checks to see if $z_{w+j} < z_w$, for $j = \{-4, -2, 2, 4\}$. Again, if true, block 25 labels the window w as a potential phoneme boundary. If not, however, flow returns to block 21 to retrieve and test the next window.

Once a window is labeled as a potential phoneme boundary (by block 25 of the flowchart), decision box 26 checks to see if the previous window—namely, window w−1 was labeled as a boundary or as a potential boundary. If it was, then flow returns to block 21 to retrieve and test the next window. If, on the other hand, window w−1 was not labeled as a boundary or as a potential boundary, then window w is labeled as a phoneme boundary (in block 27) and again, flow returns to block 21 to retrieve and test the next window.

Once a voice risk measure such as the QSFE has been measured, it may be combined with lost packet information in any of a number of ways according to various illustrative embodiments of the present invention, each of which will be obvious to those skilled in the art in view of the teachings herein. For example, a packet loss rate (determined by conventional techniques fully familiar to those skilled in the art), a packet loss distortion rate (as described in co-pending U.S. patent application Ser. No. 10/936,990, cited above), a media distortion rate (as also described in co-pending U.S. patent application Ser. No. 10/936,990, cited above), or a burst ratio (as described in U.S. Patent Application Publication No. US 2002/0154641 A1, cited above) may each be mathematically or algorithmically combined with a voice risk measure (such as, for example, the QSFE described herein) to calculate a Quality of Service (QoS) measure more useful than that provided based on lost packet information alone. According to various illustrative embodiments of the present invention, for example, a product of the QSFE measure and either a packet loss rate, a packet loss distortion rate, a media distortion rate, or a burst ratio, or, alternatively, an (optionally weighted) summation of the QSFE measure and either a packet loss rate, a packet loss distortion rate, a media distortion rate, or a burst ratio, each may be used to advantageously generate various QoS measures having the benefits of the instant invention described herein.

ADDENDUM TO THE DETAILED DESCRIPTION

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

We claim:

1. A method for calculating a Quality-of-Service measure in a packet-based communications network under packet loss conditions, the Quality-of-Service measure based on a sequence of packets transmitted over a period of time, the packets in said sequence comprising speech information, the method comprising the steps of:
   receiving a plurality of said packets in said sequence;
   determining a measure of packet loss based on said received packets; and
   calculating the Quality-of-Service measure based on said measure of packet loss and on one or more characteristics of said speech information,
   wherein said one or more characteristics of said speech information comprises a measure of a rate of failures of quasi-stationary speech behavior for said speech information comprised in said sequence of packets.

2. The method of claim 1 wherein said in measure of a rate of failures of quasi-stationary speech behavior comprises an estimate of a phoneme rate of said speech information comprised in said sequence of packets.

3. The method of claim 2 wherein said estimate of said phoneme rate of said speech information is calculated based on an energy distribution of a speech waveform represented by said speech information comprised in said sequence of packets and on one or more zero-crossings thereof.

4. The method of claim 1 wherein the Quality-of-Service measure is calculated as a product of said measure of packet loss and said measure of said rate of failures of quasi-stationary speech behavior.

5. The method of claim 1 wherein the Quality-of-Service measure is calculated as a summation of said measure of packet loss and said measure of said rate of failures of quasi-stationary speech behavior.

6. The method of claim 1 wherein said measure of packet loss comprises a packet loss rate.

7. The method of claim 1 wherein said measure of packet loss comprises a packet loss distortion rate.

8. The method of claim 1 wherein said measure of packet loss comprises a media distortion rate.

9. The method of claim 1 wherein said measure of packet loss comprises a burst ratio.

10. An apparatus for calculating a Quality-of-Service measure in a packet-based communications network under packet loss conditions, the Quality-of-Service measure based on a sequence of packets transmitted over a period of time, the packets in said sequence comprising speech information, the apparatus comprising a processor adapted to:
    receive a plurality of said packets in said sequence;
    determine a measure of packet loss based on said received packets; and
    calculate the Quality-of-Service measure based on said measure of packet loss and on one or more characteristics of said speech information,
    wherein said one or more characteristics of said speech information comprises a measure of a rate of failures of quasi-stationary speech behavior for said speech information comprised in said sequence of packets.

11. The apparatus of claim 10 wherein said measure of a rate of failures of quasi-stationary speech behavior comprises an estimate of a phoneme rate of said speech information comprised in said sequence of packets.

12. The apparatus of claim 11 wherein said estimate of said phoneme rate of said speech information is calculated based on an energy distribution of a speech waveform represented by said speech information comprised in said sequence of packets and on one or more zero-crossings thereof.

13. The apparatus of claim 10 wherein the Quality-of-Service measure is calculated as a product of said measure of packet loss and said measure of said rate of failures of quasi-stationary speech behavior.

14. The apparatus of claim 10 wherein the Quality-of-Service measure is calculated as a summation of said measure of packet loss and said measure of said rate of failures of quasi-stationary speech behavior.

15. The apparatus of claim 10 wherein said measure of packet loss comprises a packet loss rate.

16. The apparatus of claim 10 wherein said measure of packet loss comprises a packet loss distortion rate.

17. The apparatus of claim 10 wherein said measure of packet loss comprises a media distortion rate.

18. The apparatus of claim 10 wherein said measure of packet loss comprises a burst ratio.

* * * * *